(12) United States Patent
Chang

(10) Patent No.: US 7,656,136 B2
(45) Date of Patent: Feb. 2, 2010

(54) DIGITAL VOLTAGE CONVERTER WITH CONSTANT OFF-TIME AND VARIABLE ON-TIME OF CONTROLLER

(75) Inventor: Wei-Hsu Chang, Jubei (TW)

(73) Assignee: Richtek Technology Corp., Hsinchu County (TW)

( * ) Notice: Subject to any disclaimer, the term of this patent is extended or adjusted under 35 U.S.C. 154(b) by 241 days.

(21) Appl. No.: 11/826,213

(22) Filed: Jul. 13, 2007

(65) Prior Publication Data

US 2008/0284397 A1    Nov. 20, 2008

(30) Foreign Application Priority Data

May 18, 2007   (TW)   ................ 96117865 A

(51) Int. Cl.
    *G05F 1/00*    (2006.01)
    *G05F 1/613*   (2006.01)
(52) U.S. Cl. ................. 323/224; 323/222; 323/283
(58) Field of Classification Search ........... 323/222, 323/224, 283
    See application file for complete search history.

(56) References Cited

U.S. PATENT DOCUMENTS

| | | | | |
|---|---|---|---|---|
| 5,801,935 | A * | 9/1998 | Sugden et al. | 363/89 |
| 6,178,104 | B1 * | 1/2001 | Choi | 363/89 |
| 6,448,745 | B1 * | 9/2002 | Killat | 323/222 |
| 6,992,468 | B2 * | 1/2006 | Kranz | 323/283 |
| 7,141,956 | B2 * | 11/2006 | Chapuis | 323/283 |
| 7,202,651 | B2 * | 4/2007 | Chapuis | 323/283 |
| 7,315,157 | B2 * | 1/2008 | Chapuis | 323/282 |
| 7,323,851 | B2 * | 1/2008 | Markowski | 323/222 |
| 7,394,236 | B2 * | 7/2008 | Chapuis et al. | 323/283 |

* cited by examiner

*Primary Examiner*—Shawn Riley
(74) *Attorney, Agent, or Firm*—Rosenberg, Klein & Lee

(57) ABSTRACT

In a digital boost or buck-boost converter, a pulse width modulation signal has an on-time and an off-time. A constant off-time period is provided to set the off-time to be constant, and an on-time period to determine the on-time is derived by monitoring the output voltage of the converter. With the constant off-time, the output voltage and the on-time period will have a linear relation, thereby reducing the output ripple when the converter operates with a high duty-ratio.

14 Claims, 10 Drawing Sheets

| OFF | ON | Frequency of Pulse Width Modulated Signal PWM $\left[\dfrac{1}{(ON+OFF)\cdot Tclk}\right]$ | Duty-ratio of Pulse Width Modulated Signal PWM [Ton/(Ton+Toff)] | Vo/Vi (Ton/Toff) | Resolution of Vo/Vi |
|---|---|---|---|---|---|
| 1024 | 0-1023 | 293 ~ 147KHz | 0 ~ 0.5 | 0 ~ 1 | 1/1024 |
| 512 | 512-1023 | 293 ~ 195KHz | 0.5 ~ 0.667 | 1 ~ 2 | 1/512 |
| 256 | 512-1023 | 391 ~ 234KHz | 0.667 ~ 0.75 | 2 ~ 4 | 1/256 |
| 128 | 512-1023 | 469 ~ 260KHz | 075 ~ 0.8 | 4 ~ 8 | 1/128 |
| 64 | 512-1023 | 521 ~ 726KHz | 0.8 ~ 0.83 | 8 ~ 16 | 1/64 |
| 32 | 512-1023 | 551 ~ 284KHz | 0.83 ~ 0.85 | 16 ~ 32 | 1/32 |
| 16 | 512-1023 | 568 ~ 288KHz | 0.85 ~ 0.875 | 32 ~ 64 | 1/16 |
| 8 | 512-1023 | 577 ~ 291KHz | 0.875 ~ 0.889 | 64 ~ 128 | 1/8 |

Fig. 7

DIGITAL VOLTAGE CONVERTER WITH CONSTANT OFF-TIME AND VARIABLE ON-TIME OF CONTROLLER

FIELD OF THE INVENTION

The present invention is related generally to a digital voltage converter and, more particularly, to a digital voltage converter with constant off-time.

BACKGROUND OF THE INVENTION

Due to the advantages of small size, reduced number of passive elements and lower cost, digital voltage converters have been popularly adopted. FIG. 1 shows a conventional digital boost converter 100, in which an output stage 102 converts an input voltage Vi to an output voltage Vo, an error amplifier 112 generates an error signal VE based on the output voltage Vo and a reference voltage Vref, an analog to digital converter 110 quantifies the error signal VE to generate a digital error signal VD, a digital compensator 108 generates a duty-ratio d by compensating the digital error signal VD, and a digital pulse width modulator 106 generates a pulse width modulation signal PWM based on the duty-ratio d for a driver 104 in the output stage 102 to switch a power switch M1. The duty-ratio d is defined as $$d=Ton/(Ton+Toff),\qquad\qquad[\text{EQ-1}]$$

where Ton and Toff are on-time and off-time, respectively, of the pulse width modulation signal PWM.

FIG. 2 shows a conventional digital buck-boost converter 200, in which an output stage 202 converts an input voltage Vi to an output voltage Vo, an error amplifier 212 generates an error signal VE based on the output voltage Vo and a reference voltage Vref, an analog to digital converter 210 quantifies the error signal VE to generate a digital error signal VD, a digital compensator 208 generates a duty-ratio d based on the digital error signal VD by compensating the digital error signal VD, and a digital pulse width modulator 206 generates a pulse width modulation signal PWM based on the duty-ratio for a driver 204 in the output stage 202 to switch switches M1 and M2. The duty-ratio d is also defined as the equation EQ-1, and the switches M1 and M2 are turned on and off at the same time. More details of digital voltage converters may refer to D. Maksimovic, R. Zane and R. Erickson, "Impact of Digital Control in Power Electronics," Proceeding of 2004 International Symposium on Power Semiconductor Devices & Ics, pp. 13-22, and R. W. Erickon and D. Maksimovic, "Fundamentals of Power Electronics", Kluwer Academic Publishers, 2001.

In steady state, the output voltage Vo and the duty-ratio d of the digital buck-boost converter 100 have the relation $$Vo=Vi/(1-d),\qquad\qquad[\text{EQ-2}]$$

and the output voltage Vo and the duty-ratio d of the digital buck-boost converter 200 have the relation $$Vo=d\times Vi/(1-d).\qquad\qquad[\text{EQ-3}]$$

As shown in the equations EQ-2 and EQ-3, neither the converter 100 nor the converter 200 has a linear relation between the output voltage Vo and the duty-ratio d. In further detail, FIG. 3 shows the relations between the voltage conversion ratio Vo/Vi and the duty-ratio d, in which curve 300 represents the relation for the converter 100, and curve 302 represents the relation for the converter 200. As shown in the curves 300 and 302, as the duty-ratio d increases, the voltage conversion ratio Vo/Vi also increases in a non-linear manner. Since the conventional digital pulse width modulators 106 and 206 are implemented with digital control, their duty-ratio d is quantified. The quantization step Δd is also referred as resolution. In a conventional digital pulse width modulator, the quantization step Δd is constant. When it operates with high duty-ratio d (i.e. close to 1), the voltage conversion ratio Vo/Vi varies significantly when the duty-ratio d increases or decreases, thereby causing a great ripple at the output Vo. For example, if the converter 200 has a quantization step Δd of 0.01, then at the duty-ratio of 0.9, as shown by the curve 302, when the duty-ratio d increases or decreases by 0.01, the voltage conversion ratio Vo/Vi will change to 10 or 8 accordingly, thereby generating a ripple of ±1V on the output voltage Vo.

The resolution of the duty-ratio d in the converters 100 and 200 is determined by the digital pulse width modulators 106 and 206, respectively. In a conventional counter-based digital constant-frequency pulse width modulator, the timing resolution Tclk, bit width n and switching period Tsw are correlated, where the timing resolution Tclk is the clock cycle of the controllers 102 and 202, the bit width n is the bit number in each cycle of the pulse width modulation signal PWM, and the switching period Tsw is the switch cycle of the switch M1. Since the pulse width modulator operates at constant frequency, the switching period Tsw has a constant value. The timing resolution Tclk, bit width n and switch period Tsw have the relation $$Tsw=2n\times Tclk.\qquad\qquad[\text{EQ-4}]$$

To increase the resolution of the duty-ratio d, conventionally, the timing resolution Tclk is reduced, namely the clock frequency of the controllers 102 and 202 (1/Tclk) is increased. However, it is limited by this way. When the clock frequency (1/Tclk) of the controllers 102 and 202 reaches the order of GHz, the power loss will be too large to implement. Moreover, the smaller the timing resolution Tclk is, the more the implementation cost is.

Therefore, it is desired a digital boost and buck-boost converter capable of reducing the output ripple when operating with high duty-ratio.

SUMMARY OF THE INVENTION

One object of the present invention is to provide digital boost and buck-boost converters whose output ripple when operating with high duty-ratio is reduced, thereby improving the stability of their output voltage.

According to the present invention, a digital boost or buck-boost converter comprises an output stage for converting an input voltage to an output voltage, an error amplifier for generating an error signal based on the output voltage and a reference voltage, an analog to digital converter for converting the error signal to an error digital signal, a compensator for determining an on-time period based on the error digital signal, and a digital pulse width modulator for generating a pulse width modulation signal based on the on-time period and a constant off-time period for driving the output stage. In the pulse width modulation signal, the off-time is determined by the constant off-time period, and the on-time is determined by the on-time period.

Due to the constant off-time period, the output voltage and the on-time period will have a linear relation, thereby reducing the output ripple when the converter operates with a high duty-ratio.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 7 shows a simulation result of the buck-boost converter shown in FIG. 4;

DETAIL DESCRIPTION OF THE INVENTION

Figure 1:
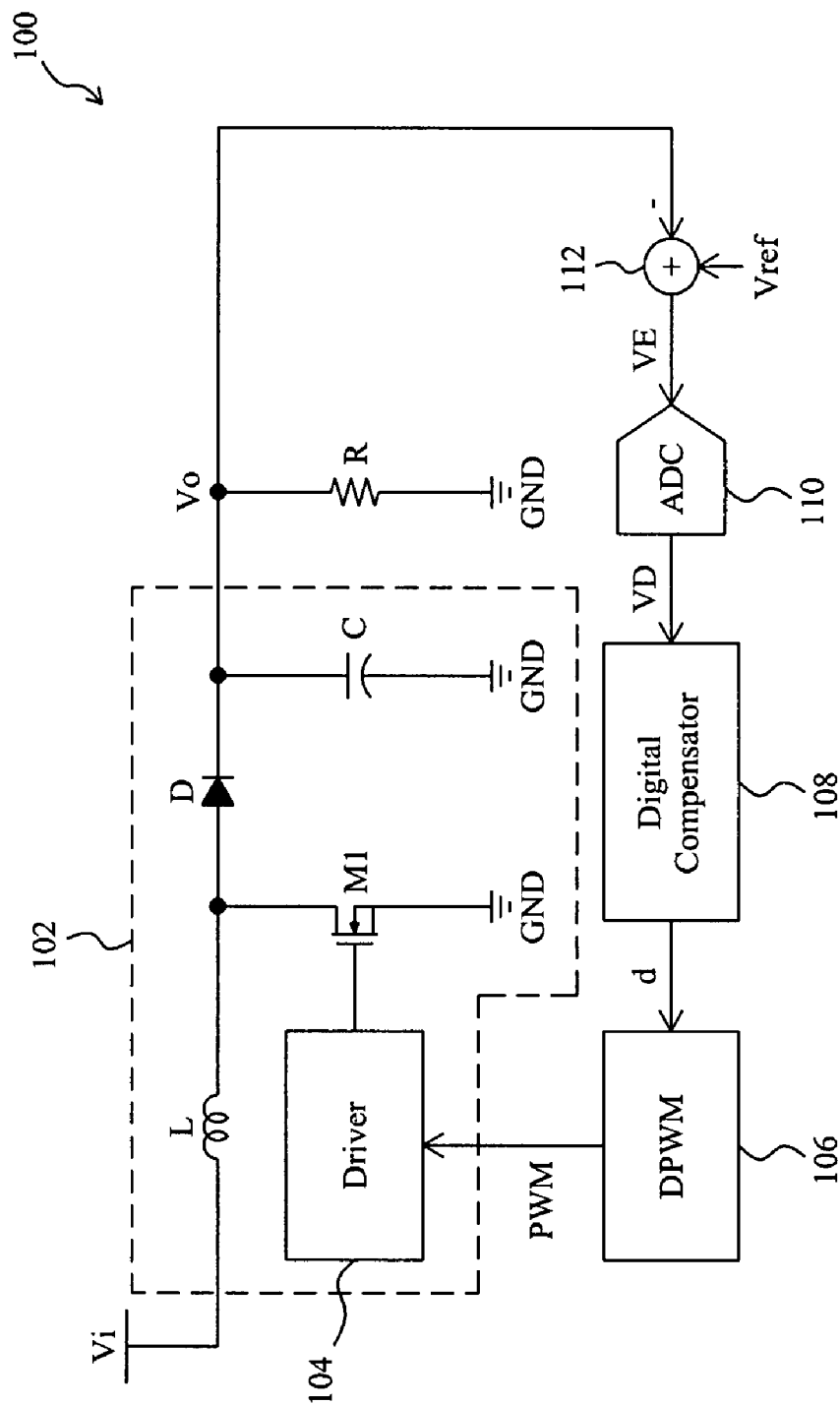
FIG. 1 shows a conventional digital boost converter.
Figure 2:
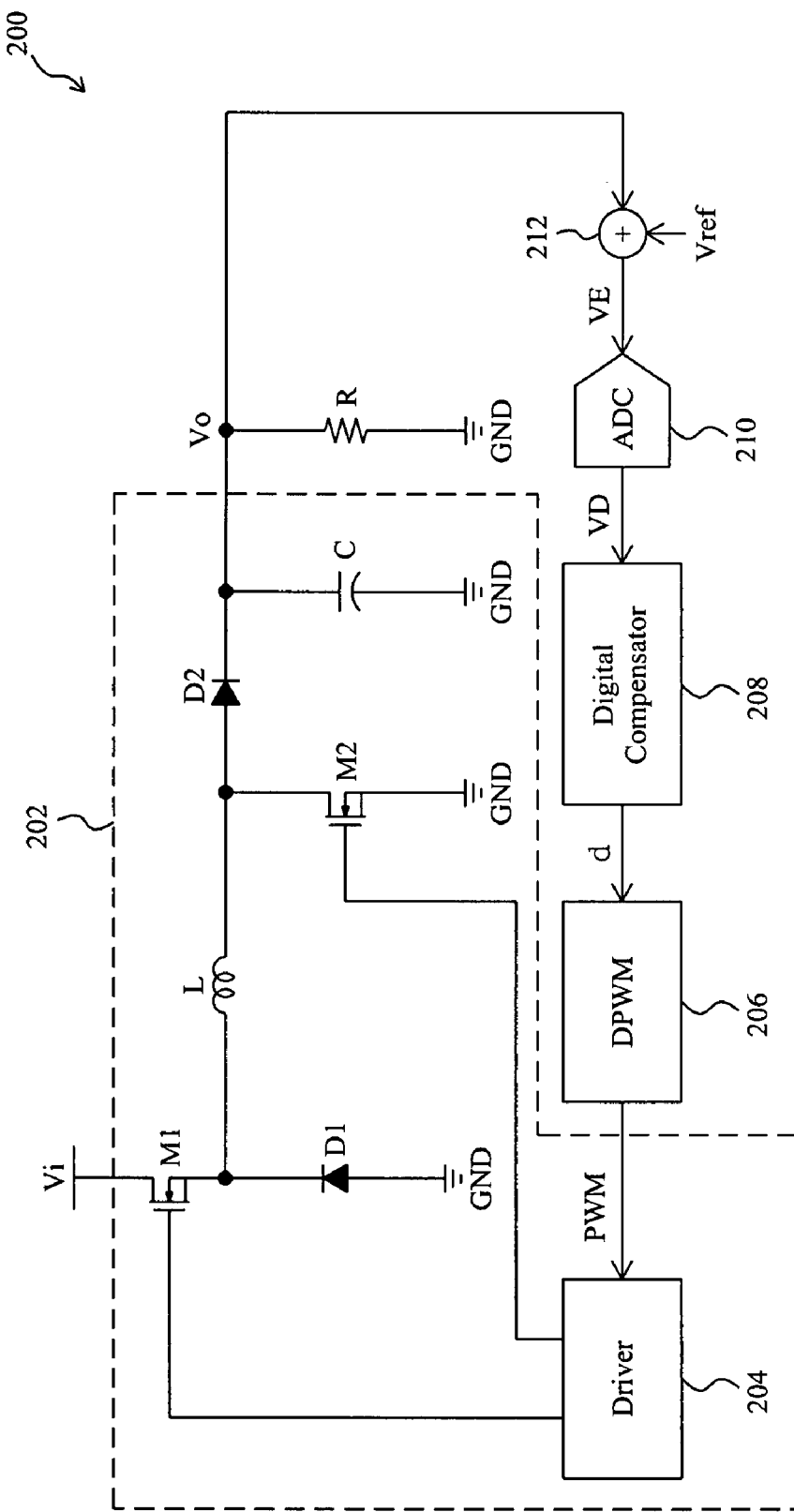
FIG. 2 shows a conventional digital buck-boost converter.
Figure 3:
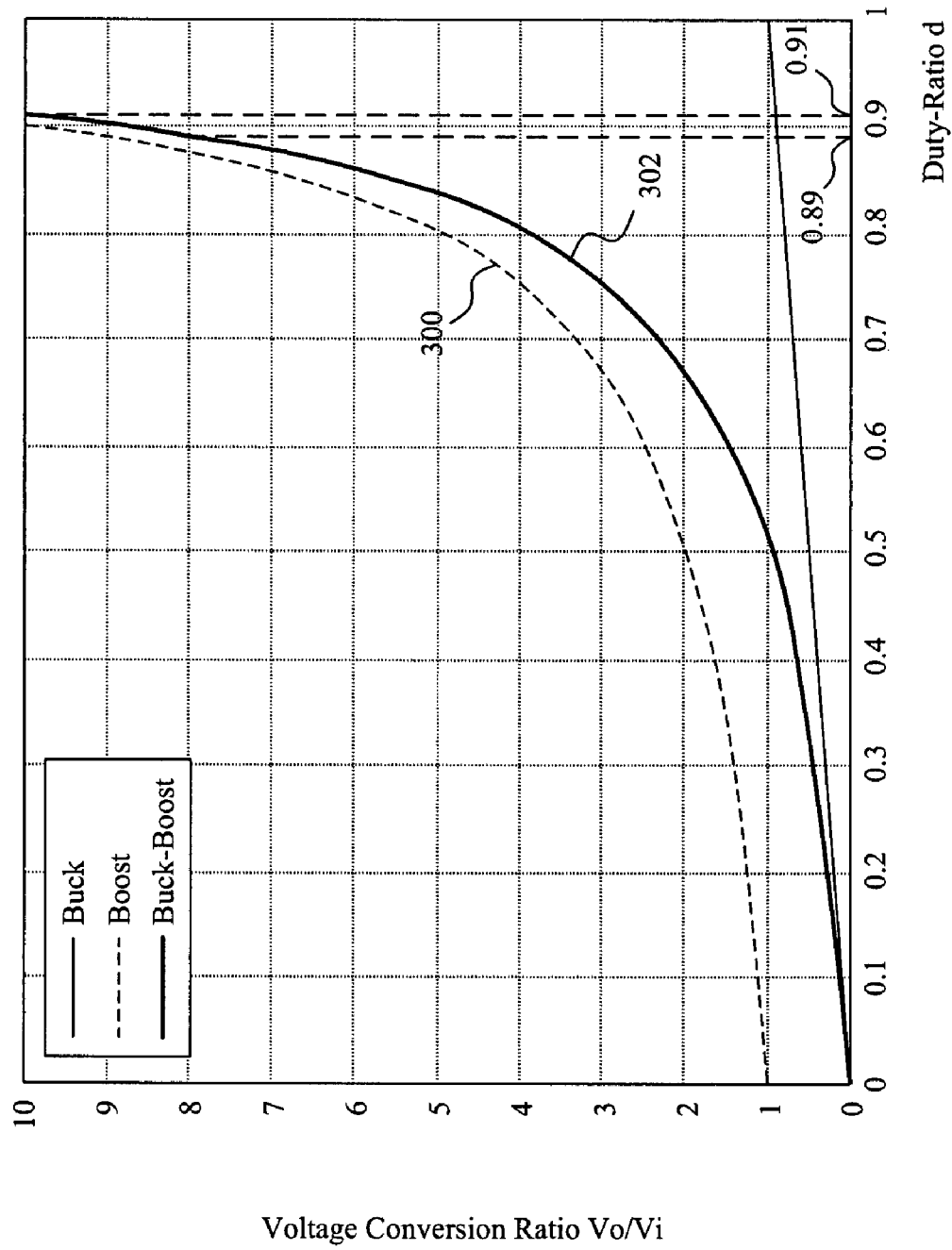
FIG. 3 shows the relations between the voltage conversion ratio and the duty-ratio.
Figure 4:
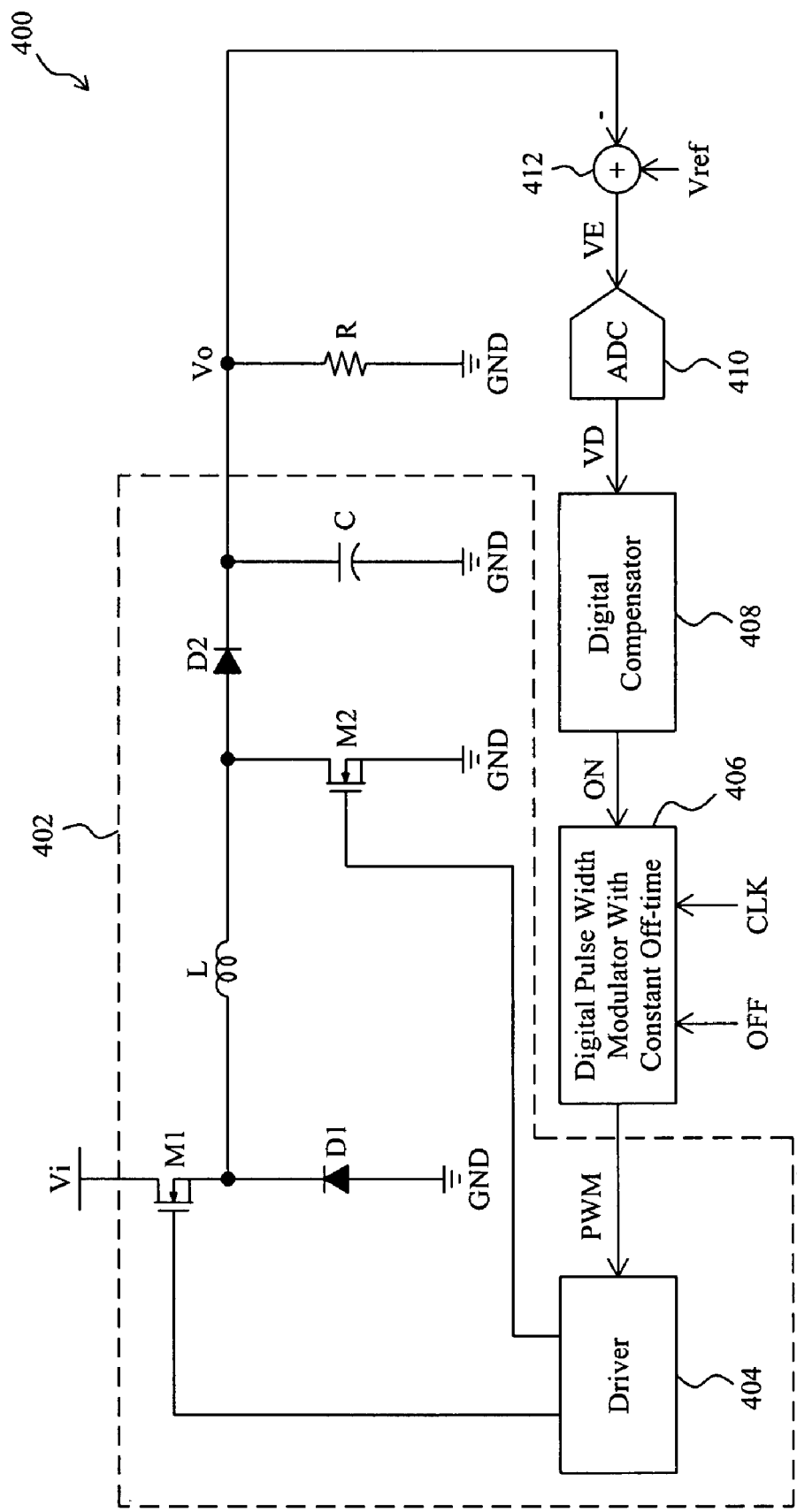
FIG. 4 provides a buck-boost converter according to the present invention.

FIG. 4 shows a buck-boost converter 400 according to the present invention, in which an output stage 402 is used to convert an input voltage Vi to an output voltage Vo, an error amplifier 412 subtracts the output voltage Vo from a reference voltage Vref to generate an error signal VE, then an analog to digital converter 410 quantifies the error signal VE to produce a digital error signal VD, a digital compensator 408 determines an on-time period ON based on the digital error signal VD, and a digital pulse width modulator 406 generates a pulse width modulation signal PWM based on the on-time period ON, a predetermined off-time period OFF, and a clock CLK for a driver 404 in the output stage 402 to switch a switch M1. The on-time period ON determines the on-time Ton of the pulse width modulation signal PWM, and the off-time period OFF is a constant value and determines the off-time Toff of the pulse width modulation signal PWM. From the equations EQ-1 and EQ-3, it is obtained the voltage conversion ratio $$Vo/Vi = Ton/Toff. \quad [EQ-5]$$

Since the off-time period OFF is constant, the off-time Toff of the pulse width modulation signal PWM is also constant. Therefore, the voltage conversion ratio Vo/Vi and the on-time Ton of the pulse width modulation signal PWM have a linear relation.

Figure 5:
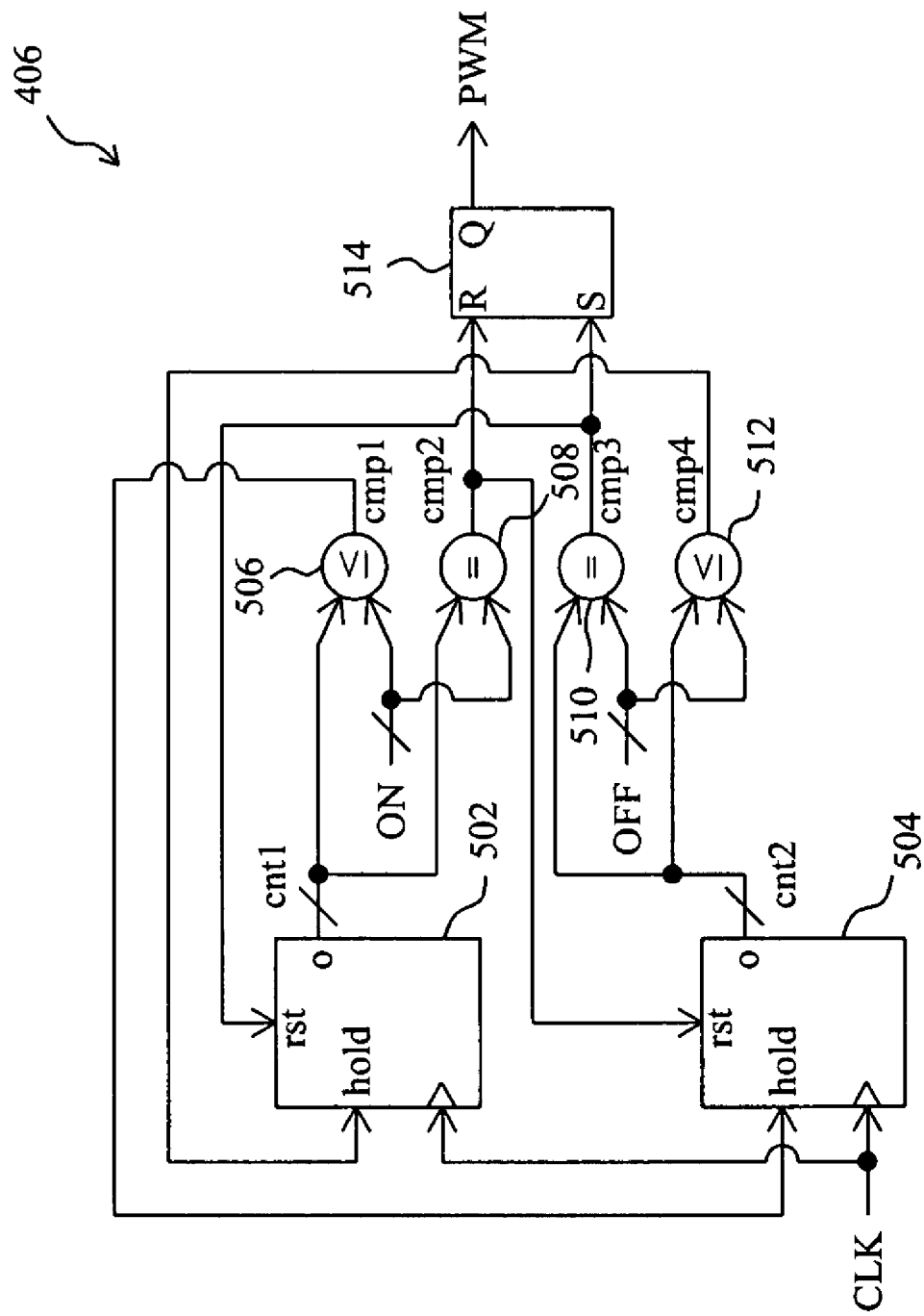
FIG. 5 provides an embodiment for the digital pulse width modulator of FIG. 4.
Figure 6:
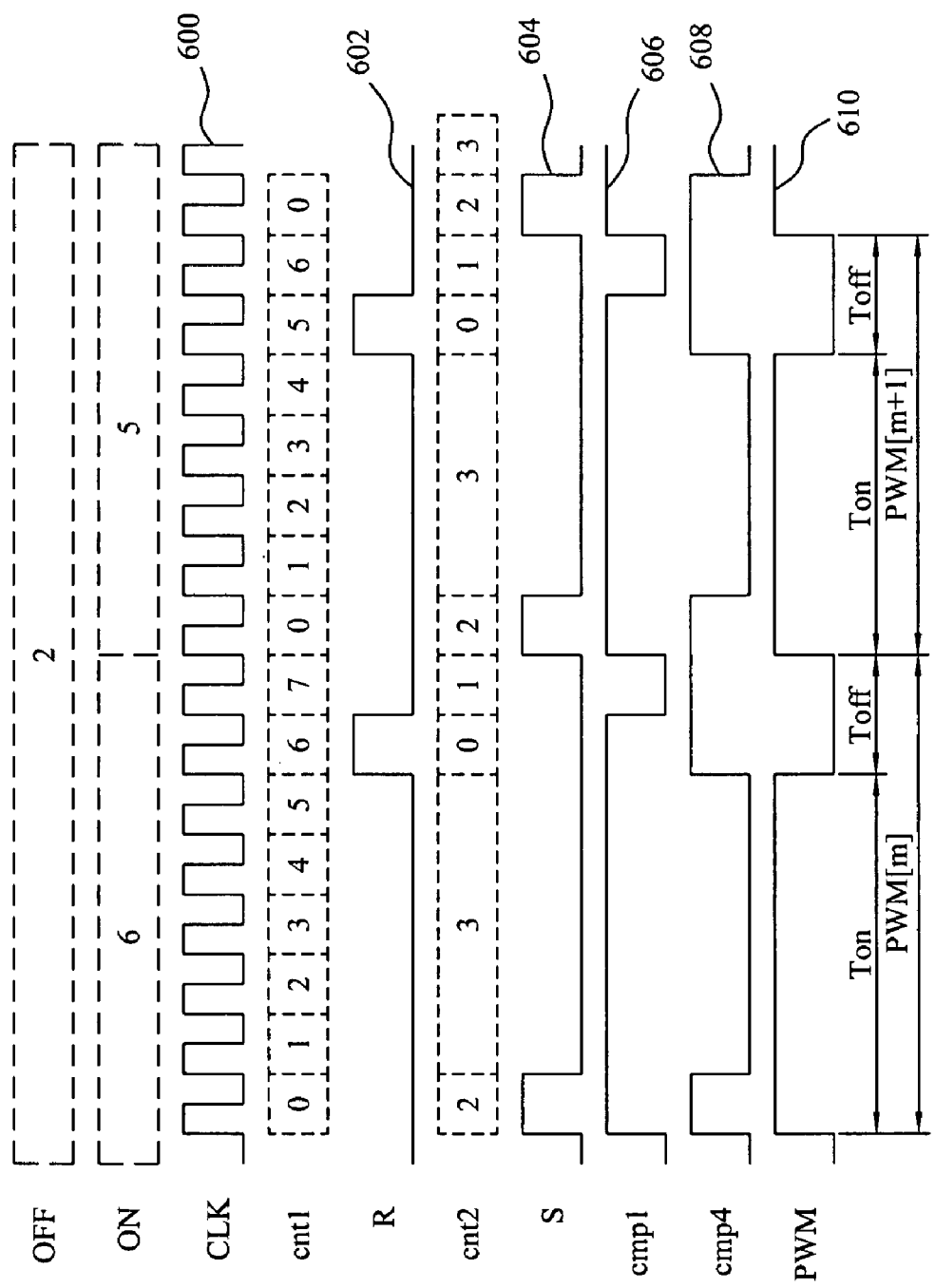
FIG. 6 illustrates the operation of the digital pulse width modulator shown in FIG. 5.

FIG. 5 shows an embodiment for the digital pulse width modulator 406 of FIG. 4, in which a counter 502 counts the clock CLK to generate a count value cnt1, a counter 504 counts the clock CLK to generate a count value cnt2, a comparator 506 compares the count value cnt1 and the on-time period ON to generate a comparison signal cmp1 to feed back to the counter 504, a comparator 508 compares the count value cnt1 and the on-time period ON to generate a comparison signal cmp2, a comparator 510 compares the count value cnt2 and the off-time period OFF to generate a comparison signal cmp3, a comparator 512 compares the count value cnt2 and the off-time period OFF to generate a comparison signal cmp4 to feed back to the counter 502, and a flip-flop 514 generates the pulse width modulation signal PWM based on the comparison signals cmp2 and cmp3. FIG. 6 illustrates the operation of the digital pulse width modulator 406 shown in FIG. 5, in which waveform 600 represents the clock CLK, waveform 602 represents the signal on the reset input R of the flip-flop 514, waveform 604 represents the signal on the set input S of the flip-flop 514, waveform 606 represents the comparison signal cmp1, waveform 608 represents the comparison signal cmp4, and waveform 610 represents the pulse width modulation signal PWM. If the cycle of the clock CLK is Tclk, then the on-time of the pulse width modulation signal PWM is $$Ton = ON \times Tclk, \quad [EQ-6]$$

and the off-time is $$Toff = OFF \times Tclk. \quad [EQ-7]$$

Based on the equations EQ-6 and EQ-7, the equation EQ-5 can be rewritten as $$Vo/Vi = ON/OFF \quad [EQ-8]$$

As shown in the equation EQ-8, the voltage conversion ratio Vo/Vi and the on-time period ON of the buck-boost converter 400 have a linear relation, and thus, when the buck-boost converter 400 operates with a high voltage conversion ratio Vo/Vi, the change of the on-time period ON will not cause the output voltage Vo to generate a large ripple.

Referring to FIGS. 5 and 6, the counter 502 counts the clock CLK to generate the count value cnt1, and when the count value cnt1 is no greater than the on-time period ON, the output cmp1 of the comparator 506 will be high, which is fed back to the hold input of the counter 504 and as a result, the counter 504 will hold the count value cnt2. When the count value cnt1 is equal to the on-time period ON, the output cmp2 of the comparator 508 will be high, which resets the flip-flop 514 so as to cause the pulse width modulation signal PWM at low level, and resets the counter 504 and thereby the count value cnt2 back to zero. When the count value cnt1 becomes greater than the on-time period ON, the output cmp1 of the comparator 506 is low, which triggers the counter 504 to count. When the count value cnt2 is no greater than the off-time period OFF, the output cmp4 of the comparator 512 is high, which is fed back to the hold input of the counter 502 and as a result, the counter 502 will hold the count value cnt1. When the count value cnt2 is equal to the off-time period OFF, the output cmp3 of the comparator 510 is high, which sets the flip-flop 514 so as to cause the pulse width modulation signal PWM to be high, and resets the counter 502 and thereby the count value cnt1 back to zero. When the count value cnt2 becomes greater than the off-time period OFF, the output cmp4 of the comparator 512 becomes low, which triggers the counter 502 to count again. The above process repeats again and again. Since the off-time period OFF is constant, the switching frequency of the pulse width modulation signal PWM will vary with the given on-time period ON. In the embodiment shown in FIG. 6, the off-time period OFF is 2, and the m-th cycle of the pulse width modulation signal PWM has the on-time period ON of 6. From the equation EQ-8, the voltage conversion ratio Vo/Vi is 3. In the (m+1)-th cycle of the pulse width modulation signal PWM, the on-time period ON changes to 5, and thus the voltage conversion ratio Vo/Vi is 2.5. Obviously, each time the on-time period ON is increased or decreased by 1, the voltage conversion ratio Vo/Vi is increased or decreased by 0.5, and thus the voltage conversion ratio Vo/Vi and the on-time period ON have a linear relation.

FIG. 7 shows a simulation result of the buck-boost converter 400 shown in FIG. 4, under the counter clock CLK of 300 MHz. When the off-time period OFF is set at 1,024, the on-time period ON varies between 0 to 1,023, and thus, the voltage conversion ratio Vo/Vi varies between 0 and 1. In this case, the equivalent duty-ratio d of the pulse width modulation signal PWM has a varying range of from 0 to 0.5, the frequency varies in the range of from 293 to 147 KHz, and the resolution of the voltage conversion ratio Vo/Vi is equal to (1/OFF). As a result, when the on-time Ton is changed by 1 unit, the voltage conversion ratio Vo/Vi will be increased or decreased by (1/OFF). Thus, the voltage conversion ratio Vo/Vi and the on-time period ON have a linear relation. As shown by the data of FIG. 7, as the voltage conversion ratio Vo/Vi increases, the linear relation is still remained.

Figure 8:
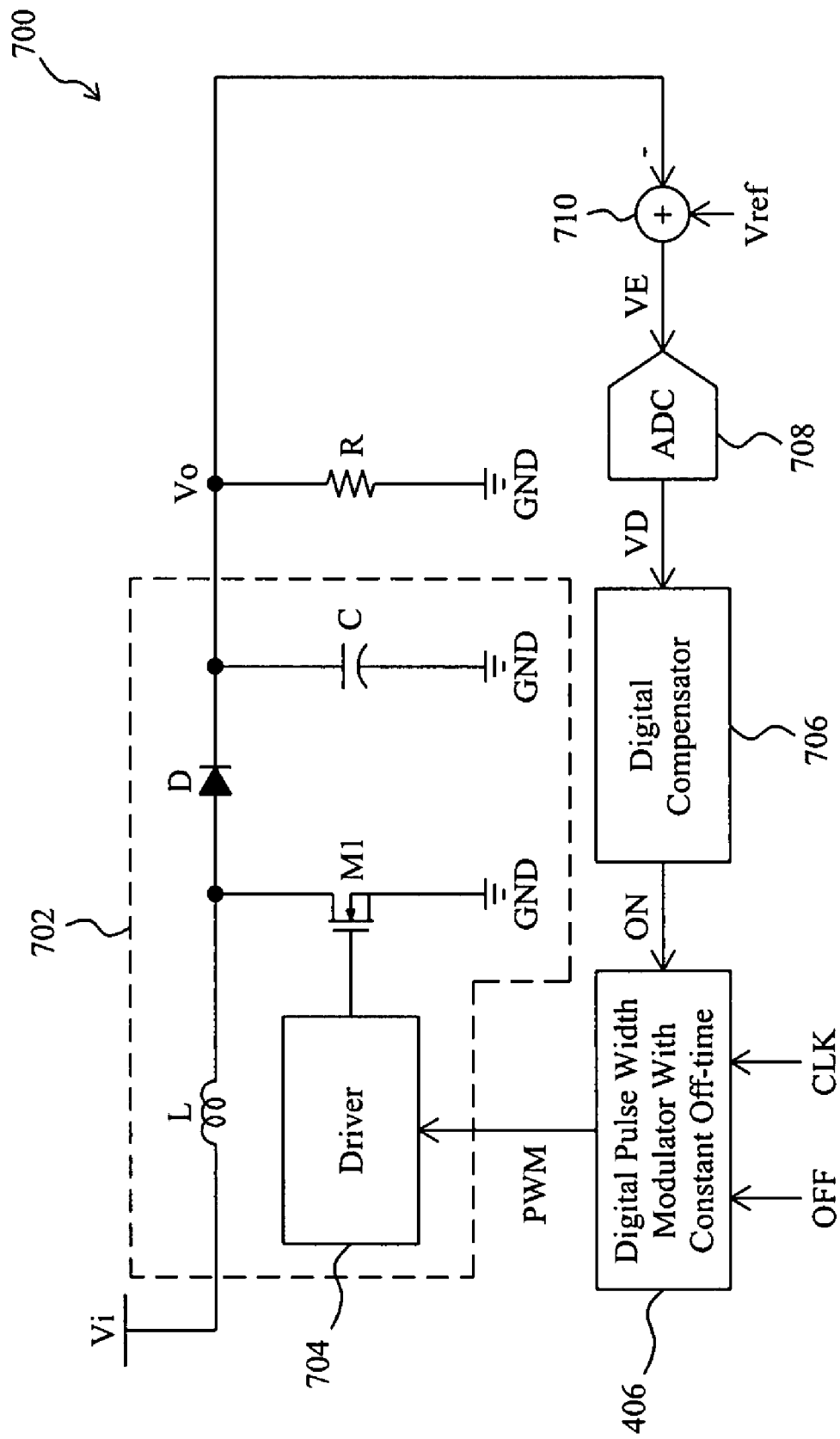
FIG. 8 shows a boost converter according to the present invention.

FIG. 8 shows a boost converter 700 according to the present invention, in which an output stage 702 boosts up the input voltage Vi to generate an output voltage Vo, an error amplifier 710 subtracts the output voltage Vo from a reference voltage Vref to generate an error signal VE, then an analog to digital converter 708 quantifies the error signal VE to generate a digital signal. VD, a digital compensator 706 determines an on-time period ON based on the digital error signal VD, and a digital pulse width modulator 406 generates the pulse width modulation signal PWM based on the on-time period ON, a predetermined off-time period OFF, and a clock CLK for a driver 704 in the output stage 702 to switch the switch M1. The off-time period OFF is a constant value. From the equations EQ-1 and EQ-2, it is obtained the voltage conversion ratio $$Vo/Vi = 1 + (Ton/Toff). \qquad [EQ-9]$$

Based on the equations EQ-6 and EQ-7, the equation EQ-9 can be written as $$Vo/Vi = 1 + (ON/OFF) \qquad [EQ-10]$$

As shown in the equation EQ-10, the voltage conversion ratio Vo/Vi and the on-time period ON of the boost converter 700 have a linear relation. Referring to FIG. 6, the off-time period OFF is set at 2, and the m-th cycle of the pulse width modulation signal PWM has the on-time period ON of 6. From the equation EQ-8, the voltage conversion ratio Vo/Vi is 4. In the (m+1)-th cycle of the pulse width modulation signal PWM, the on-time period ON changes to 5, and thus the voltage conversion ratio is Vo/Vi is 3.5. Obviously, the voltage conversion ratio Vo/Vi and the on-time period ON have a linear relation, and thus, when the converter 700 operates with a high voltage conversion ratio Vo/Vi, the change of the on-time period ON will not cause the output voltage Vo to generate a great ripple.

Figure 9:
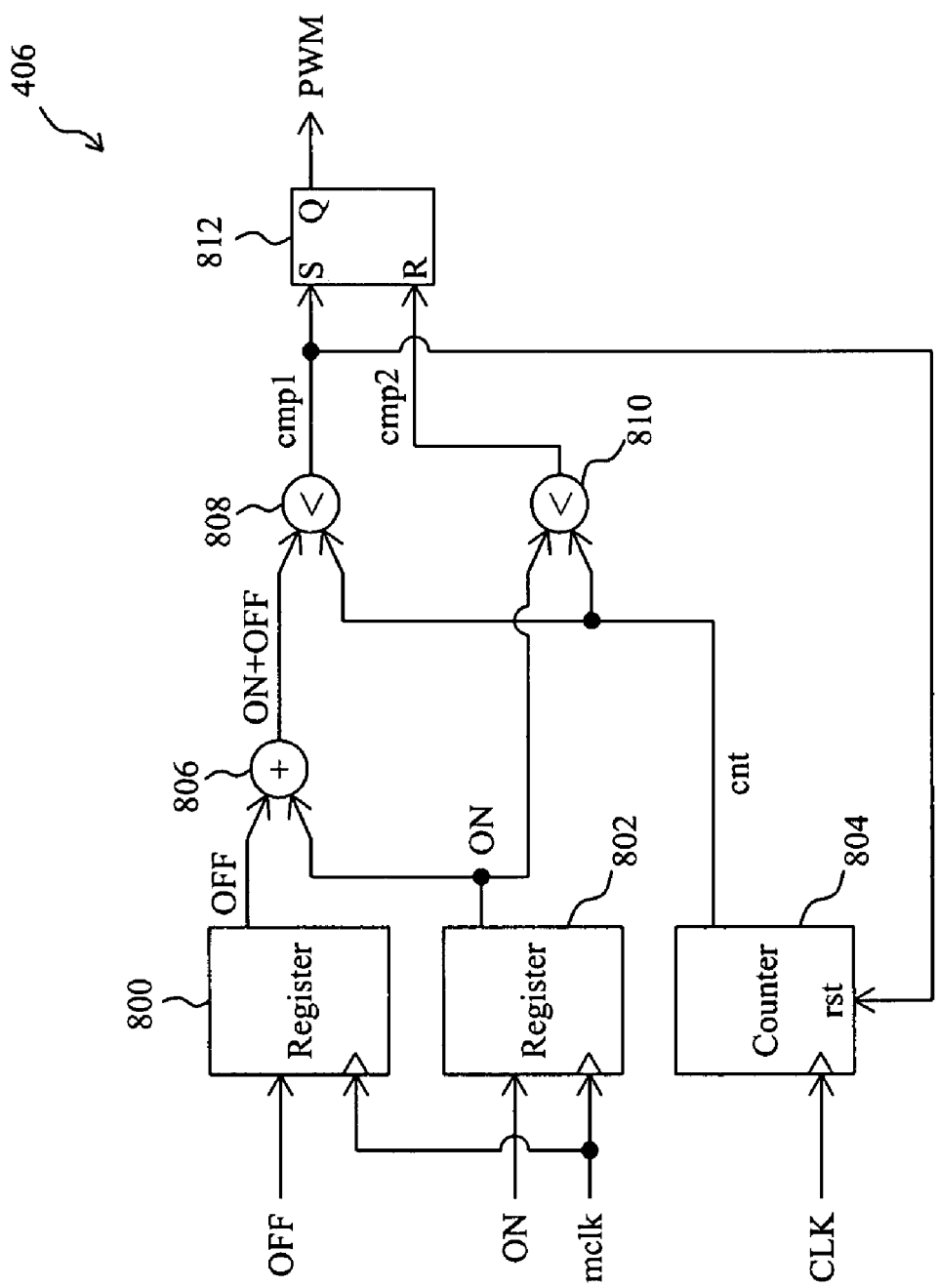
FIG. 9 shows a second embodiment for the digital pulse width modulator having a constant off-time.
Figure 10:
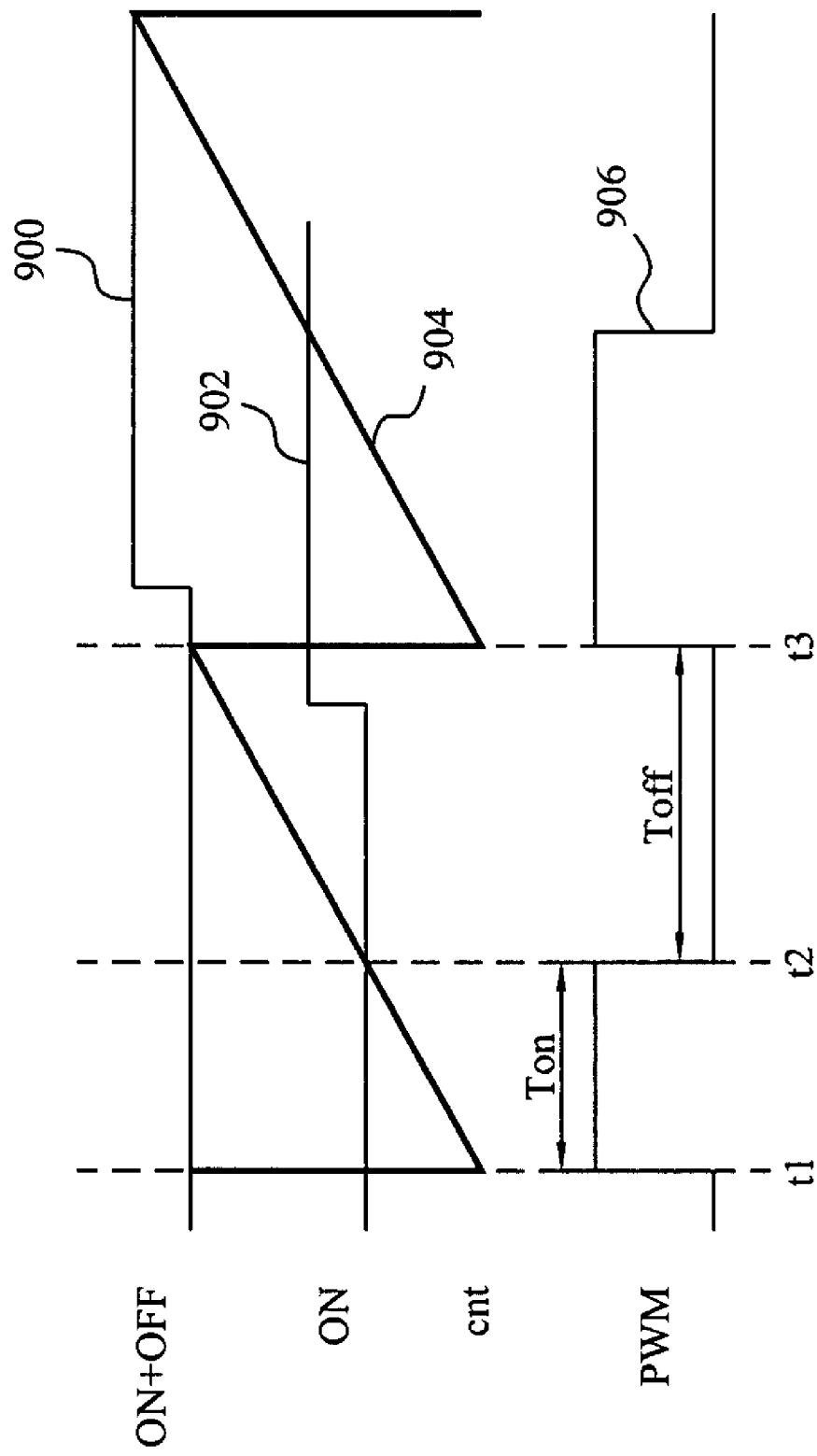
FIG. 10 illustrates the operation of the digital pulse width modulator shown in FIG. 9.

FIG. 9 shows a second embodiment for the digital pulse width modulator 406 having a constant off-time, in which registers 800 and 802 store the off-time period OFF and the on-time period ON, respectively, a counter 804 generates a count value cnt based on the counter clock CLK, an adder 806 combines the on-time period ON and the off-time period OFF to determine a cycle period ON+OFF, a comparator 808 compares the cycle period ON+OFF with the count value cnt to generate a comparison signal cmp1, a comparator 810 compares the on-time period ON with the count value cnt to generate a comparison signal cmp2, and a flip-flop 812 generates the pulse width modulation signal PWM based on the comparison signals cmp1 and cmp2. FIG. 10 illustrates the operation of the digital pulse width modulator 406 shown in FIG. 9, in which waveform 900 represents the cycle period ON+OFF, waveform 902 represents the on-time period ON, waveform 904 represents the count value cnt, and waveform 906 represents the pulse width modulation signal PWM. Referring to FIGS. 9 and 10, at time t1, the count value cnt is greater than the cycle period ON+OFF, and thus the output cmp1 of the comparator 808 sets the flip-flop 812 so as to trigger the pulse width modulation signal PWM to be high, and resets the counter 804 and thereby the count value cnt back to 0. At time t2, the count value cnt is greater than the on-time period ON, and thus the output cmp2 of the comparator 810 resets the flip-flop 812 so as to change the state of the pulse width modulation signal PWM to be low. Until next time the count value cnt is greater than the cycle period ON+OFF, as shown at time t3, the output cmp1 of the comparator 808 sets the flip-flop 812 again, and the pulse width modulation signal PWM changes to high accordingly.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A digital boost converter comprising:
   an output stage for converting an input voltage to an output voltage;
   an error amplifier for generating an error signal from the output voltage and a reference voltage input thereto;
   an analog to digital converter for converting the error signal to a digital error signal;
   a compensator for determining an on-time period based on the digital error signal; and
   a digital pulse width modulator having an input coupled to the compensator for receipt of a signal therefrom corresponding to the on-time period, the digital pulse width modulator having another input for receiving a signal corresponding to a constant off-time period, the digital pulse width modulator generating a pulse width modulation signal based on the on-time period and the constant off-time period to drive the output stage;
   wherein the on-time period determines an on-time of the pulse width modulation signal, and the constant off-time period determines an off-time of the pulse width modulation signal.

2. The converter according to claim 1, wherein the digital pulse width modulator comprises:
   a first counter for generating a first count value;
   a second counter for generating a second count value;
   a first comparator for comparing the first count value and the on-time period to generate a first comparison signal to hold the second counter when the first count value is no greater than the on-time period;
   a second comparator for comparing the first count value and the on-time period to generate a second comparison signal to reset the second counter when the first count value is equal to the on-time period;
   a third comparator for comparing the second count value and the off-time period to generate a third comparison signal to reset the first counter when the second count value is equal to the off-time period;
   a fourth comparator for comparing the second count value and the off-time period to generate a fourth comparison signal to hold the first counter when the second count value is no greater than the off-time period; and
   a flip-flop for generating the pulse width modulation signal based on the second and third comparison signals.

3. The converter according to claim 1, wherein the digital pulse width modulator comprises:
- a counter for providing a count value;
- an adder for combing the on-time period and the off-time period to generate a cycle period;
- a first comparator for comparing the count value and the cycle period to generate a first comparison signal to reset the counter when the count value is greater than the cycle period;
- a second comparator for comparing the count value and the on-time period to generate a second comparison signal when the count value is greater than the on-time period; and
- a flip-flop for generating the pulse width modulation signal based on the first and second comparison signals.

4. A control method for a digital boost converter including an output stage to convert an input voltage to an output voltage, the control method comprising the steps of:
- generating an on-time period by monitoring the output voltage;
- providing a constant off-time period; and
- generating a pulse width modulation signal based on the on-time period and the off-time period for driving the output stage;
- wherein the on-time period determines an on-time of the pulse width modulation signal, and the off-time period determines an off-time of the pulse width modulation signal.

5. The method according to claim 4, wherein the step of generating an on-time period by monitoring the output voltage comprises the steps of:
- generating an error signal from the output voltage and a reference voltage;
- converting the error signal to a digital error signal; and
- generating the on-time period based on the digital error signal.

6. The method according to claim 4, wherein the step of generating a pulse width modulation signal based on the on-time period and the off-time period comprises the steps of:
- generating a first count value and a second count value;
- comparing the first count value and the on-time period for generating a first comparison signal to hold the second value when the first count value is no greater than the on-time period;
- comparing the first count value and on-time period for generating a second comparison signal to reset the second count value when the first count value is equal to the on-time period;
- comparing the second count value and off-time period for generating a third comparison signal to reset the first count value when the second count value is equal to the off-time period;
- comparing the second count value and off-time period for generating a fourth comparison signal to hold the first count value when the second count value is no greater than the off-time period; and
- generating the pulse width modulation signal based on the second and third comparison signals.

7. The method according to claim 4, wherein the step of generating a pulse width modulation signal based on the on-time period and the off-time period comprises the steps of:
- generating a count value;
- combining the on-time period and the off-time period for generating a cycle period;
- generating a first comparison signal for resetting the counter when the count value is greater than the cycle period;
- generating a second comparison signal when the count value is greater than the on-time period; and
- generating the pulse width modulation signal based on the first and second comparison signals.

8. A digital buck-boost converter comprising:
- an output stage for converting an input voltage to an output voltage;
- an error amplifier for generating an error signal from the output voltage and a reference voltage input thereto;
- an analog to digital converter for converting the error signal to a digital error signal;
- a compensator for generating an on-time period based on the digital signal; and
- a digital pulse width modulator having an input coupled to the compensator for receipt of a signal therefrom corresponding to the on-time period, the digital pulse width modulator having another input for receiving a signal corresponding to a constant off-time period, the digital pulse width modulator generating a pulse width modulation signal based on the on-time period and the constant off-time period to drive the output stage;
- wherein the on-time period determines an on-time of the pulse width modulation signal, and the constant off-time period determines an off-time of the pulse width modulation signal.

9. The converter according to claim 8, wherein the digital pulse width modulator comprises:
- a first counter for generating a first count value;
- a second counter for generating a second count value;
- a first comparator for comparing the first count value and an on-time period to generate a first comparison signal to hold the second counter when the first count value is no greater than the on-time period;
- a second comparator for comparing the first count value and the on-time period to generate a second comparison signal to reset the second counter when the first count value is equal to the on-time period;
- a third comparator for comparing the second count value and the off-time period to generate a third comparison signal to reset the first counter when the second count value is equal to the off-time period;
- a fourth comparator for comparing the second count value and the off-time period to generate a fourth comparison signal to hold the first counter when the second count value is no greater than the off-time period; and
- a flip-flop for generating the pulse width modulation signal based on the second and third comparison signals.

10. The converter according to claim 8, wherein the digital pulse width modulator comprises:
- a counter for providing a count value;
- an adder for combing the on-time period and the off-time period to generate a cycle period;
- a first comparator for comparing the count value and the cycle period to generate a first comparison signal to reset the counter when the count value is greater than the cycle period;
- a second comparator for comparing the count value and the on-time period to generate a second comparison signal when the count value is greater than the on-time period; and
- a flip-flop for generating the pulse width modulation signal based on the first and second comparison signals.

11. A control method for a digital buck-boost converter including an output stage to convert an input voltage to an output voltage, the control method comprising the steps of:
- generating an on-time period by monitoring the output voltage;

providing a constant off-time period; and generating a pulse width modulation signal based on the on-time period and the off-time period for driving the output stage;

wherein the on-time period determines an on-time of the pulse width modulation signal, and the off-time period determines an off-time of the pulse width modulation signal.

12. The method according to claim 11, wherein the step of generating an on-time period by monitoring the output voltage comprises the steps of:

generating an error signal from the output voltage and a reference voltage;

converting the error signal to a digital error signal; and generating the on-time period based on the digital error signal.

13. The method according to claim 11, wherein the step of generating a pulse width modulation signal based on the on-time period and the off-time period comprises the steps of:

generating a first count value and a second count value;

comparing the first count value and the on-time period for generating a first comparison signal to hold the second value when the first count value is no greater than the on-time period;

comparing the first count value and on-time period for generating a second comparison signal to reset the second count value when the first count value is equal to the on-time period;

comparing the second count value and off-time period for generating a third comparison signal to reset the first count value when the second count value is equal to the off-time period;

comparing the second count value and off-time period for generating a fourth comparison signal to hold the first count value when the second count value is no greater than the off-time period; and generating the pulse width modulation signal based on the second and third comparison signals.

14. The method according to claim 11, wherein the step of generating a pulse width modulation signal based on the on-time period and the off-time period comprises the steps of:

generating a count value;

combining the on-time period and the off-time period for generating a cycle period;

generating a first comparison signal for resetting the counter when the count value is greater than the cycle period;

generating a second comparison signal when the count value is greater than the on-time period; and generating the pulse width modulation signal based on the first and second comparison signals.

\* \* \* \* \*